US009333432B2

(12) United States Patent
Inagawa et al.

(10) Patent No.: US 9,333,432 B2
(45) Date of Patent: May 10, 2016

(54) METHODS AND APPARATUSES FOR UPDATING A GAME MEDIUM

(71) Applicant: DeNA Co., Ltd., Tokyo (JP)

(72) Inventors: Masatoshi Inagawa, Tokyo (JP); Eri Aikawa, Tokyo (JP); Ayaka Watanabe, Tokyo (JP); Takahiro Ezaki, Tokyo (JP); Ryo Yamasaki, Tokyo (JP); Yoshikazu Oda, Tokyo (JP)

(73) Assignee: DENA CO., LTD., Tokyo (JP)

( * ) Notice: Subject to any disclaimer, the term of this patent is extended or adjusted under 35 U.S.C. 154(b) by 207 days.

(21) Appl. No.: 14/070,304

(22) Filed: Nov. 1, 2013

(65) Prior Publication Data

US 2014/0295972 A1  Oct. 2, 2014

(30) Foreign Application Priority Data

Mar. 26, 2013 (JP) ................... 2013-064706

(51) Int. Cl.
| | |
|---|---|
| G06F 17/00 | (2006.01) |
| A63F 13/69 | (2014.01) |
| A63F 13/822 | (2014.01) |
| A63F 13/825 | (2014.01) |
| A63F 13/335 | (2014.01) |
| A63F 13/833 | (2014.01) |
| A63F 13/58 | (2014.01) |
| A63F 13/30 | (2014.01) |
| A63F 13/79 | (2014.01) |
| A63F 13/35 | (2014.01) |

(52) U.S. Cl.
CPC ............. *A63F 13/69* (2014.09); *A63F 13/30* (2014.09); *A63F 13/335* (2014.09); *A63F 13/58* (2014.09); *A63F 13/822* (2014.09); *A63F 13/825* (2014.09); *A63F 13/833* (2014.09); *A63F 13/35* (2014.09); *A63F 13/79* (2014.09)

(58) Field of Classification Search
CPC ....... A63F 13/58; A63F 13/35; A63F 13/822; A63F 13/00; A63F 13/12; A63F 13/30; A63F 13/53; A63F 13/69; A63F 2300/807
See application file for complete search history.

(56) References Cited

U.S. PATENT DOCUMENTS

2005/0148390 A1* 7/2005 Murase et al. ................. 463/40
2006/0003843 A1* 1/2006 Kobayashi et al. ............ 463/43

OTHER PUBLICATIONS

Pokemon, Dec. 2012, Bulbapedia, <http://bulbapedia.bulbagarden.net/w/index.php?title=Caught_Pok%C3%A9mon&oldid=1757393>,<http://bulbapedia.bulbagarden.net/w/index.php?title=Global_Terminal&oldid=1813189>,<http://bulbapedia.bulbagarden.net/w/index.php?title=Time&oldid=1822072> (see cont.).*

(Continued)

*Primary Examiner* — Justin Myhr
(74) *Attorney, Agent, or Firm* — Procopio, Cory, Hargreaves & Savitch LLP

(57) ABSTRACT

To increase the player's expectation in a fight game using game media, the present invention provides a server device that controls a game in which a player does a fight using game media in a game space through a network. The server device includes a storage unit configured to store player information including information about the game media that the player owns in the game space and about a status of the game media; a determining portion configured to determine whether a specific game medium among the game media that the player owns has satisfied a predetermined temporal requirement; and an updating portion configured to update the player information so as to change the specific game medium from a first status to a second status when the determining portion determines that the specific game medium has satisfied the predetermined temporal requirement.

6 Claims, 8 Drawing Sheets

(56) References Cited

OTHER PUBLICATIONS (cont.) <http://bulbapedia.bulbagarden.net/w/index.php?title=Pok%C3%A9mon_battle&oldid=1811999>,<http://bulbapedia.bulbagarden.net/w/index.php?title=Evolution&oldid=1822394>,<http://bulbapedia.bulbagarden.net/w/index.php?title=Methods_of_evolution&oldid=1793728>.*

Pokemon Egg, Dec. 12, 2012, Bulbapedia, <http://bulbapedia.bulbagarden.net/w/index.php?title=Pok%C3%A9mon_Egg&oldid=1814567>.*
Terra Branford, Dec. 14, 2012, final fantasy, <http://finalfantasy.wikia.com/wiki/Terra_Branford?oldid=1517591>.*
Japanese Patent Application No. 2013-064706; Office Action mailed on Jul. 16, 2013.
"Gundam Card Collection", "Famitsu mobage, No. 8, Enterbrain, Inc., Sep. 10, 2012, Weekly Famitsu Extra Edition on Oct. 18, 2012", pp. 8 to 16.

* cited by examiner

FIG. 5

| CARD ID | NAME | RARITY | MAXIMUM LEVEL | ATTACK STRENGTH | DEFENSE STRENGTH | HIT POINTS | MYSTERY CARD | STATUS |
|---|---|---|---|---|---|---|---|---|
| 0001 | A | COMMON | 30 | 50 | 30 | 75 | × | — |
| ... | ... | ... | ... | ... | ... | ... | ... | ... |
| 0005 | E | COMMON | 30 | 90 | 20 | 40 | × | — |
| ... | ... | ... | ... | ... | ... | ... | ... | ... |
| 0100 | X | RARE | 50 | 125 | 160 | 150 | × | — |
| ... | ... | ... | ... | ... | ... | ... | ... | ... |
| 5001 | XYZ | SUPER RARE | 80 | 10 | 10 | 10 | ○ | FIRST STATUS |
|  |  | SUPER RARE+ | 80 | 2500 | 2300 | 3000 | ○ | SECOND STATUS |
| ... | ... | ... | ... | ... | ... | ... | ... | ... |
| 5012 | YZX | SUPER RARE | 80 | 10 | 5 | 15 | ○ | FIRST STATUS |
|  |  | SUPER RARE+ | 80 | 2700 | 2000 | 3200 | ○ | SECOND STATUS |

FIG. 6

POSSESSED CARD INFORMATION: PLAYER A

| POSSESSED CARD ID | LEVEL | ATTACK STRENGTH | DEFENSE STRENGTH | HIT POINTS | ACQUISITION TIME | MYSTERY CARD | STATUS |
|---|---|---|---|---|---|---|---|
| 0001 | 12 | 120 | 95 | 160 | 2012/04/05 | × | — |
| 0003 | 1 | 45 | 45 | 60 | 2012/04/17 | × | — |
| 0006 | 6 | 90 | 60 | 100 | 2012/04/09 | × | — |
| ... | ... | ... | ... | ... | ... | ... | |
| 5001 | 1 | 10 | 10 | 10 | 2012/08/02 | ○ | FIRST STATUS |
| ... | ... | ... | ... | ... | ... | ... | |
| 5012 | 5 | 4500 | 2700 | 4800 | 2012/08/19 | ○ | SECOND STATUS | ns # METHODS AND APPARATUSES FOR UPDATING A GAME MEDIUM

CROSS-REFERENCE TO RELATED APPLICATION(S)

This application claims the benefit of Japanese Patent Application No. 2013-064706, filed Mar. 26, 2013, the disclosure of which is hereby incorporated by reference in its entirety.

BACKGROUND OF THE INVENTION

1. Field of the Invention

The present invention relates to a server device and a game program.

2. Description of Related Art

A game in which the players (the characters that the players control) fight against each other using game media, for example, cards is widely known (for example, JP 2001-2390560 A). Each of the players can advantageously carry on a fight by enhancing a game medium that the player owns.

SUMMARY OF THE INVENTION

However, the player can easily expect the final status of the game medium (for example, the game card) (for, example, how much the game medium is finally enhanced) according to the initial strength or rarity (rarity value) of the game medium in a conventional fight game. Thus, it is difficult to increase the player's expectation.

In light of the foregoing, an objective of the present invention is to increase the player's expectation in a fight game using game media.

To solve the above-mentioned problem, the present invention mainly provides a server device that controls a game in which a player does a fight using game media in a game space through a network, the server device including a storage unit configured to store player information including information about the game media that the player owns in the game space and about a status of the game media; a determining portion configured to determine whether a specific game medium among the game media that the player owns has satisfied a predetermined temporal requirement; and an updating portion configured to update the player information so as to change the specific game medium from a first status to a second status when the determining portion determines that the specific game medium has satisfied the predetermined temporal requirement.

Other characteristics of the present invention will become clear from the description of the present specification and the appended drawings.

The present invention can increase the player's expectation in a fight game using game media.

BRIEF DESCRIPTION OF THE DRAWINGS

FIG. 5 is a diagram illustrating an exemplary data configuration of the card information stored in a data storage unit 12 in the server device 10;

FIG. 6 is a diagram illustrating an exemplary data configuration of the cards that the player owns in the player information stored in the data storage unit 12 in the server device 10;

DETAILED DESCRIPTION OF THE INVENTION

Figure 1:
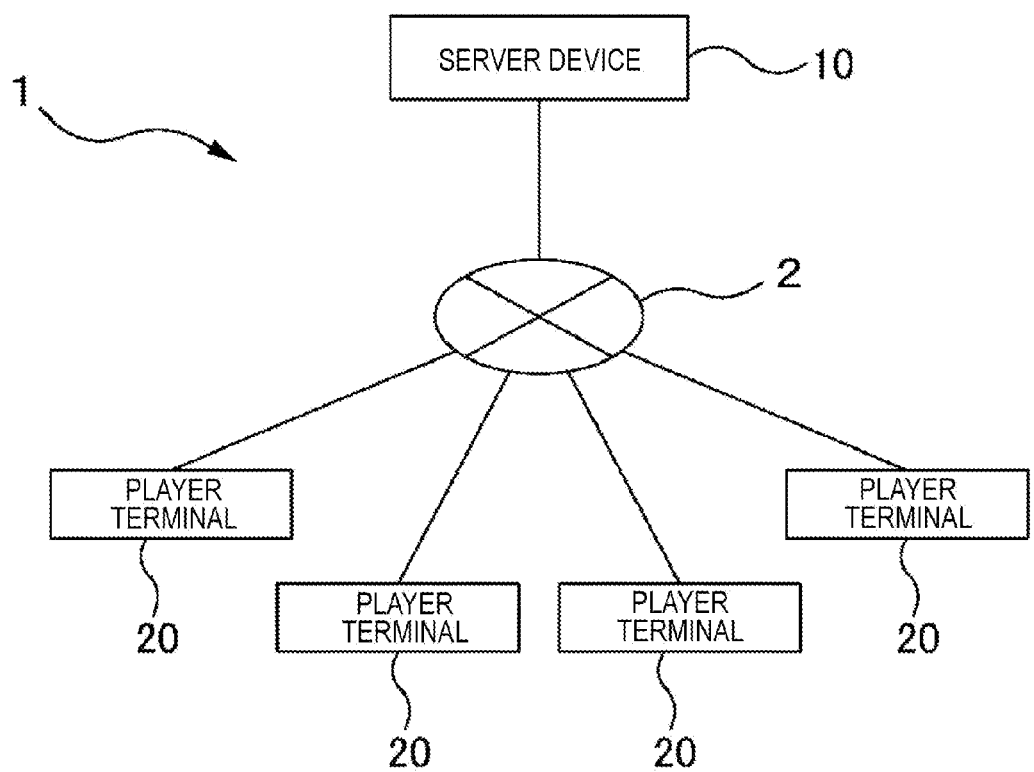
FIG. 1 is a diagram illustrating an example of an overall configuration of a game system 1 according to the present embodiment.

At least the following matters will become clear according to the description of the present specification and the appended drawings.

A server device that controls a game in which a player does a fight using game media in a game space through a network, the server device including a storage unit configured to store player information including information about the game media that the player owns in the game space and about a status of the game media; a determining portion configured to determine whether a specific game medium among the game media that the player owns has satisfied a predetermined temporal requirement; and an updating portion configured to update the player information so as to change the specific game medium from a first status to a second status when the determining portion determines that the specific game medium has satisfied the predetermined temporal requirement.

Such a server device can increase the player's expectation in a fight game using game media.

In the server device, whole or a part of information about the first status of the specific game medium may not be disclosed to a player owning the specific game medium until the specific game medium has satisfied the predetermined temporal requirement.

Such a server device can stimulate the player's imagination and increase the player's expectation for the second status by preventing the information about the first status from being disclosed.

In the server device, the information about the status of the game media can include information about a parameter in the first status and a parameter in the second status of the specific game medium, and the parameter of the specific game medium in the second status can differ from the parameter of the specific game medium in the first status.

Such a server device can further increase the player's expectation by causing the player to imagine that the parameter in the second status becomes much higher (in some cases, lower) in comparison with the parameter in the first status.

The server device can further include a correcting portion configured to correct the parameter of the specific game medium in the second status so as to raise the parameter for a predetermined period of time.

Such a server device can cause the player owning a game medium to advantageously carry on the game for a predetermined period (for example, for a period when an event is held) by enhancing the game medium for the period. This can increase the player's motivation to join an event.

In the server device, the determining portion can determine whether the player has satisfied a predetermined fight requirement by doing a fight using the specific game medium in the first status in addition to satisfying the temporal requirement, and the updating portion can update the player information so as to change the specific game medium from the first status to the second status when the specific game medium in the first status has satisfied the temporal requirement and the fight requirement.

In such a server device, tightening the requirement for changing the game medium from the first status to the second status causes the player to have difficulty satisfying the requirement. However, this can further increase the player's expectation for the change of the game medium to the second status.

The server device can further include a distributing portion configured to distribute the specific game medium in the first status to the player such that the player owns the game medium, wherein the distributing portion preferentially can distribute the specific game medium in the first status to a player that has satisfied a predetermined requirement in the game.

In such a server device, many players make an effort to satisfy a predetermined requirement in order to acquire a valuable limited card. For example, many players actively join an event in order to be a higher-ranking winner of the event. This can liven the game.

The description and the appended drawings also disclose a non-transitory computer-readable storage medium storing game program causing an information processing apparatus to execute a game in which a player does a fight using game media in a game space through a network, the game program causing the information processing apparatus to execute: storing, with a storage unit, player information including information about the game media that the player owns in the game space and about a status of the game media; determining, with a determining portion, whether a specific game medium among the game media that the player owns has satisfied a predetermined temporal requirement; and updating, with an updating portion, the player information so as to change the specific game medium from a first status to a second status when the determining portion determines that the specific game medium has satisfied the predetermined temporal requirement.

Embodiments

Configuration of Game System 1

FIG. 1 is a diagram illustrating an example of an overall configuration of a game system 1 according to the present embodiment.

The game system 1 is configured to provide various services associated with a game (for example, a social game) to a user (hereinafter, also referred to as a "player") through a network 2. The game system 1 includes a server device 10 and a plurality of player terminals 20 that are connected to the network 2 to be able to communicate with each other.

The player can play a game transmitted through the network 2 by accessing the game system 1 from a player terminal 20. The player can communicate with the other players by accessing the game system 1.

<Server Device 10>

Figure 2:
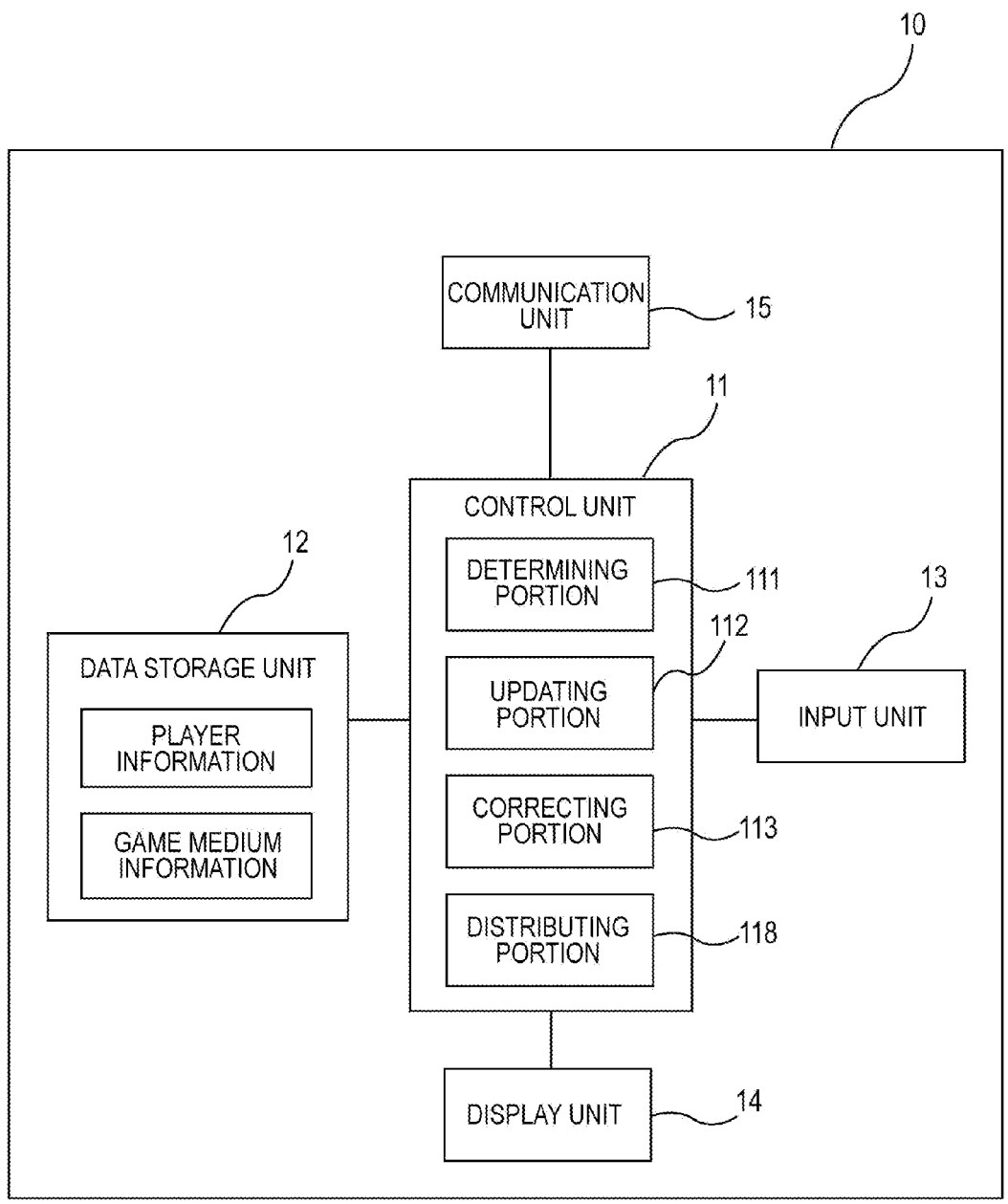
FIG. 2 is a block diagram illustrating a functional configuration of the server device 10 according to the present embodiment.

FIG. 2 is a block diagram illustrating a functional configuration of a server device. The server device 10 is an information processing device (for example, a workstation, a personal computer, and the like) used when a system administrator and the like manage the game service. The server device 10 can distribute (response) a game program operable on the player terminal 20, and a web page (game screen, and the like) made in a markup language (HTML, and the like) according to a specification of the player terminal 20 upon receiving various commands (requests) from the player terminal 20. The server device 10 in the present embodiment includes a control unit 11, a data storage unit 12, an input unit 13, a display unit 14, and a communication unit 15.

The control unit 11 is configured to pass data to each unit with controlling the entire server device 10. The control unit 11 includes a determining portion 111, an updating portion 112, a correcting portion 113, and a distributing portion 118. A specific operation of each of the units will be described below.

The storage unit 12 includes a read only memory (ROM) that is a read only storage area in which a system program is stored, and a random access memory (RAM) that is a rewritable storage area used as a work area for arithmetic processing by the control unit 11. The storage unit 12 is, for example, realized by a non-volatile storage device, such as a flash memory or a hard disk. The data storage unit 12 in the present embodiment stores the information about game media (for example, game cards) or items used in the game. The data storage unit 12 further stores, for example, the player information that is the information about the strength of each player, or a game medium that the player owns in the game. The data configuration of the information stored in the data storage unit 12 will be described below.

The input unit 13 is a unit though which the system administrator or the like inputs various types of data or the setting of the game (for example, the setting of a sacrificial medium to be described below). The input unit 13 is implemented, for example, with a keyboard, or a mouse.

The display unit 14 is used for displaying an operation screen for the system administrator based on a command from the control unit 11, and is, for example, realized by a liquid crystal display (LCD) and the like.

The communication unit 15 is configured to communicate with the player terminals 20. The communication unit 15 has functions as a receipt unit that receives various types of data and signals transmitted from the player terminals 20 and as a transmission unit that transmits the data and the signal to the player terminals 20 in response to the instruction from the control unit 11. The communication unit 15 is, for example, realized by a network interface card (NIC), and the like.

<Player Terminal 20>

Figure 3:
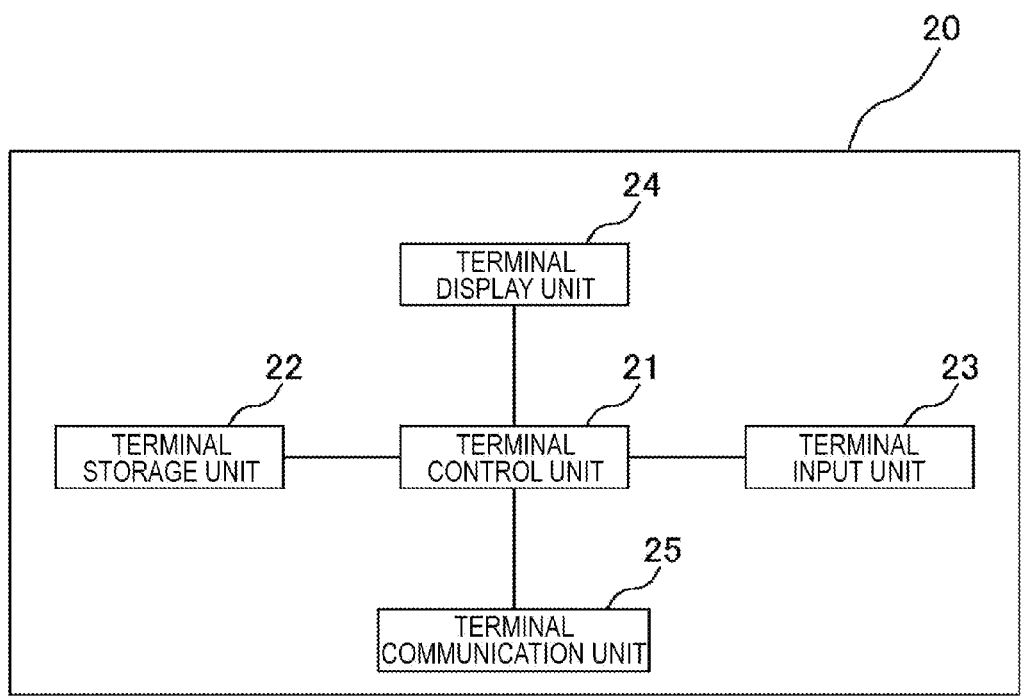
FIG. 3 is a block diagram illustrating a functional configuration of a player terminal 20 according to the present embodiment.

FIG. 3 is a block diagram illustrating a functional configuration of the player terminal 20. The player terminal 20 is an information processing terminal that the player (user) operates while playing a game. The player terminal 20 is, for example, a mobile phone terminal, a smartphone, a personal computer, or a game console. The player terminal 20 transmits and receives information with the server device 10 accessible though the network 2. The player terminal 20 includes a terminal control unit 21, a terminal storage unit 22, a terminal input unit 23, a terminal display unit 24, and a terminal communication unit 25.

The terminal control unit 21 performs data passing among units and controls the entire player terminal 20, and is realized by the central processing unit (CPU) executing a program stored in a predetermined memory. Note that the terminal control unit 21 of the present embodiment also functions as a screen display control unit that controls a display form of the game screen displayed in the terminal display unit 24.

The terminal storage unit 22 is connected to the terminal control unit 21 through a bus, and performs processing of referring to, reading out, rewriting stored data according to a command from the terminal control unit 21. The terminal storage unit 22 is realized, for example, by a flash memory, a hard disk, and the like.

The terminal input unit 23 is used when the player performs various operations (for example, the operation of the game, or the operation for inputting a text). The terminal input unit 23 is implemented, for example, with an operation button, or a touch panel.

The terminal display unit 24 is configured to display the screen of the game generated based on the game information according to the instruction from the terminal control unit 21. The terminal display unit 24 is implemented, for example, with a liquid crystal display (LCD).

The terminal communication unit 25 is configured to communicate with the server device 10. The terminal communication unit 25 has functions as a receipt unit that receives various data and signals transmitted from the server device 10 and as a transmission unit that transmits the data and the signals to the server device 10 in response to the instruction from the terminal control unit 21. The communication unit 15 is, for example, realized by a network interface card (NIC), and the like.

<<Outline of Game>>

The outline of the game provided by the game system 1 will be described. The game system 1 in the present embodiment is capable of providing a fight game using game media to the player (user). Hereinafter, a fighting card game using game cards as exemplary game media will be described. Note that the game cards are used as digital contents so as to be virtual cards used in a virtual space in the game.

<Fighting Card Game>

The game system 1 in the present embodiment is capable of providing a fighting card game in which the character selected by the player fights against the opponent character operated by the other player or the computer to determine the winner.

First, the player selects a character to do a fight in the fighting card game. The player can own a plurality of game cards (virtual cards used in the virtual space in the game) in the present embodiment. Each of the game cards corresponds to a game character. Thus, selecting one or a plurality of cards to be used in a fight from among the game cards that the player owns sets the character corresponding to the selected game cards as the character to do a fight (game medium for a fight). Levels are included in the game card (characters corresponding to the game cards). The value of the parameter (for example, the attack strength, the defense strength, or the hit points) included in the game card increases as the level is raised. Thus, the player can advantageously carry on the fight by collecting high-level game cards.

Figure 4:
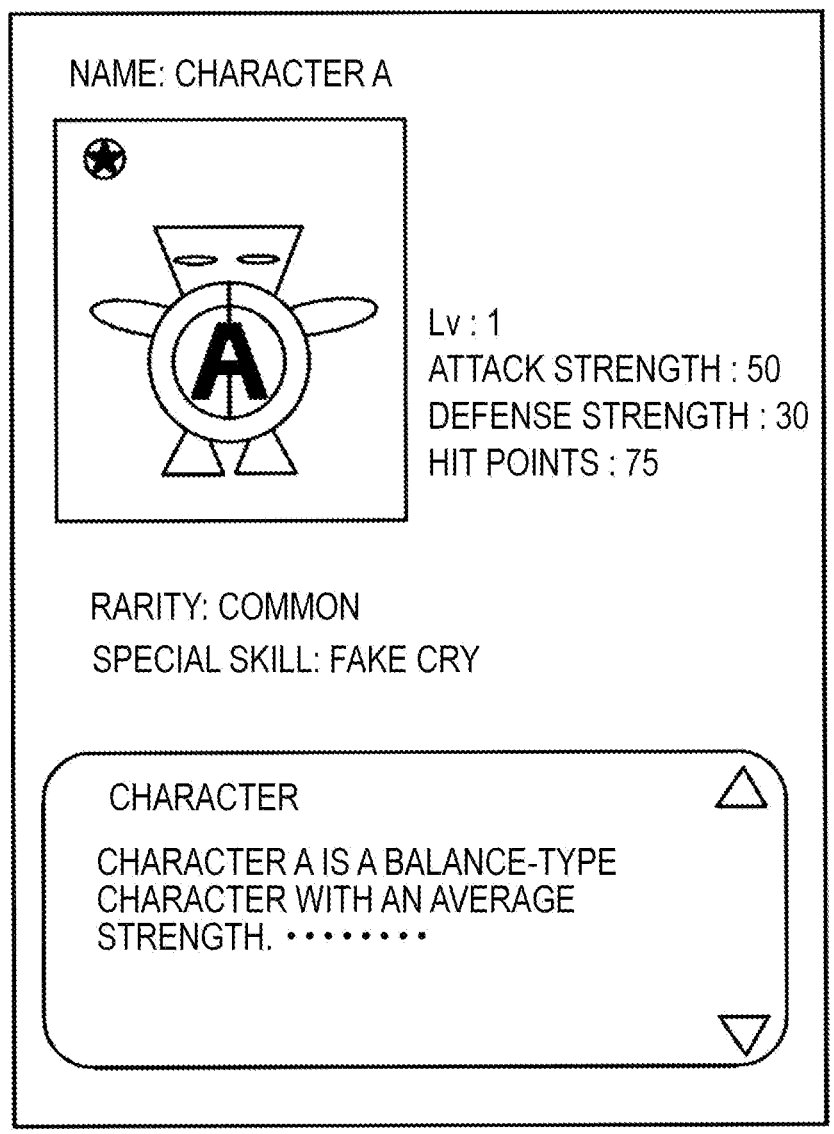
FIG. 4 is a diagram illustrating an exemplary screen of the character profile of the game card displayed on a terminal display unit 24.

FIG. 4 is a diagram illustrating an exemplary screen of the character profile of the game card displayed on the terminal display unit 24. As illustrated in FIG. 4, the graphic of the character corresponding to the game card together with the information including the level (Lv) of the character, the parameters at the level, and the description of the character are displayed. The player can confirm the information about the strength of the game card (the character) by checking the screen as illustrated in FIG. 4.

The player fights against the fighting game medium of the other player or the computer, using the player's own fighting game media (selected game card(s)). The winner of the fight is determined based on the value of the parameter included in each of the fighting game media of both the player and the opponent. For example, the attack strength of the fighting game medium of the player is compared with the defense strength of the fighting game medium of the opponent. When the attack strength of the fighting game medium of the player is higher than the defense strength of the fighting game medium of the opponent, the play becomes the winner. On the other hand, when the attack strength of the fighting game medium of the player is equal to or less than the defense strength of the fighting game medium of the opponent, the play becomes the loser. Note that the method for determining the winner of a fight is not limited to the above-mentioned method. A method in which the player that has given a larger damage to the opponent, or the player that has reduced the hit points of the opponent to zero first becomes the winner can be used.

When winning the fight, the player acquires the experience value, the in-game currency, or an item as a reward for the victory. Collecting the rewards can advantageously carry on the game. For example, accumulating the experience values raises the level of the game card, or buying a stronger item with the in-game currency facilitates winning a fight.

<Flow of Game>

Next, the entire flow of the game will be described.

The player carries on the game (social game) provided in the present embodiment by accomplishing missions. The "mission" means an assignment or a duty given to the player in the game. The mission is variously referred to, for example, a "quest" or an "exploration" depending on the game. Accomplishing a mission can get the in-game currency or an item, or causes a fight against an opponent. The achievement rate of missions is increased every time when the player accomplishes a mission. When the achievement rate reaches 100%, the player is deemed to have cleared the mission. Then, the player can select a new mission. The player can carry on the game by completing the missions one after another. Separately from the mission, the player can freely do a fight (battle) against the other player. The player can acquire a reward for the victory by winning the fight.

The information about the experience value, the money that the player has (the in-game currency that the player has), and the action point is set as parameters for each of the players. The parameters vary depending on the progress of the game. For example, when the player accomplishes a mission, the experience value and the money that the player has are increased as the result of the mission.

The player can join an in-game event (hereinafter, merely referred to as an "event") in the game according to the present embodiment. The "event" is an occasion held in the game for a certain period of time (for example, for a week from Sunday to Saturday). The players accomplish the missions that occur in the event so as to compete on the points, for example, the experience values acquired during the event or the number of victories in the fights during the event. Then, the players are ranked in the event. The players receive rewards depending on the rank in the event. The rewards include the in-game currency, an item, and a game card. In particular, the higher-ranking winners of the event receive, for example, a limited card only available to the winners as the reward. Such a limited card has a high rarity (rarity value) and strong parameters. Thus, many players come to actively join the event in order to acquire the limited card. This can liven the game. Note that the player does not have to necessarily join an event and can accomplish a normal mission even during a period when the event is held.

<Enhancement in Game Card>

As described above, the players fight against each other using the fighting game media (primarily, the game cards) in the game according to the present embodiment. At that time, the strength of the card game that the player owns greatly affects the conclusion of the fight. In other words, the player that owns a game card having a higher parameter (strong game card) can carry on the game more advantageously. Thus, the players want to acquire a stronger game card.

There is a method as a common way for the player to acquire a strong game card, in which the player raises the level of the game card or combines a plurality of game cards in order to enhance the game card. In the method in which the player raises the level of a game card, the player gains the experience value by winning a fight and thus can gradually increase a parameter of the game card. In the method in which the player combines the game cards, the player can generate a new game card by combining the same type or various types of game cards as materials. However, the players can easily expect the strength of the game card after the enhancement according to the parameter or rarity of the game card before the enhancement in the methods. For example, the final strength of the game card is often nearly several times as strong as the initial strength of the game card in the method in which the player raises the level of a game card. A game card slightly stronger than the game card before the enhancement is often generated in the method in which the player combines the game cards. Thus, the player can easily expect the strength of the game card after the enhancement according to the strength of the game card before the enhancement. This contributes to the boredom with the game because it is difficult to expect to acquire a strong game card (a game card having a high parameter) in the methods in the past even if the player wants to acquire such a strong game card.

In light of the foregoing, introducing a "mystery card" of which strength after enhancement is not easily expected increases the player's expectation for acquisition of a strong game card in the game according to the present embodiment. The "mystery card" is a game card that changes from a first status to a second status by satisfying a predetermined requirement. The mystery card is distributed in the first status to the player. In other words, the mystery card in in the first status when the player acquires the mystery card. At that stage, the second status of the mystery card is not disclosed to the player. In other words, the mystery card is a game card of which status after change is unknown (a mystery). The first status has quite different parameters from the second status. Thus, it is difficult for the player to expect how the mystery card is enhanced when the mystery card changes from the first status to the second status. The player can confirm the true strength of the mystery card only after the mystery card has changed to the second status. This can cause the player to guess how the mystery card is enhanced when the player acquires the mystery card. The player's expectation can be raised.

For example, a mystery card has very low parameters in the first status. Thus, it is difficult to use the mystery card in the first status as a force in a fight. Merely owing a mystery card in the first status does not give the player so many advantages. However, once the mystery card changes to the second status by satisfying a predetermined requirement, the parameters included in the mystery card in the first status are dramatically raised. This changes the mystery card to a strong game card.

Note that the player can also raise the level of the mystery card, similarly to normal game cards. The mystery card will be described in detail below.

<<Data Configuration>>

Next, the data configuration of the game according to the present embodiment will be described. The data storage unit 12 in the server device 10 stores various types of information, for example, the information about the game cards working as the game media and the game items, and the information about the players. The information used in the game system 1 according to the present embodiment will be described. FIG. 5 is a diagram illustrating an exemplary data configuration of the card information. FIG. 6 is a diagram illustrating an exemplary data configuration of the cards that the user owns in the player information.

<Card Information>

The card information includes card ID that is exemplary identification information that identifies each game card, and various types of information about each of the game cards linked to the card ID. For example, as illustrated in FIG. 5, the card information includes the card ID, the characters corresponding to the game cards, the maximum levels of the characters, various parameters in the initial levels (the initial parameters) including the attack strength, the defense strength, and the hit points, and the information indicating whether the game card is a mystery card. In addition to the information, the card information can further include, for example, information about the rarity (rarity values) of the game cards, or the skills (special abilities) that are exerted in a fight.

When the game card is a mystery card, the mystery card has the maximum levels and the initial parameters status in each status. For example, the mystery card denoted with a card ID 5001 has the initial parameters in the first status and the initial parameters in the second status in FIG. 5.

<Player Information>

Possessed card information in the player information indicates a game card that each player owns (hereinafter, also referred to as a "possessed card"). Note that each game card has its own parameters. The parameters are stored in the data storage unit 12 with being linked to the ID of each card game. For example, as illustrated in FIG. 6, the possessed card information includes the ID of the possessed card, the level of the character corresponding to the game card, various parameters at the level including the attack strength, the defense strength, and the hit points. The parameters including the attack strength and the like can be calculated from the initial parameters of the game card recorded as the card information (see FIG. 5) and the current level of the game card. The player information can include the information about the time when the player has acquired the game card (the acquisition time).

The player information according to the present embodiment includes the information indicating whether the game card that the player owns is a mystery card and the information indicating the status of the game card when the game card is a mystery card. The information indicating the current status of a mystery card is necessary because the mystery card changes the status based on a predetermined requirement as described above. Then, the parameters are determined based on the current status and level of the mystery card.

For example, the mystery card having the card ID 5001 is in the first status and at a level 1 in FIG. 6. The parameters of the mystery card in the status in FIG. 6 are determined with reference to the initial parameters of the mystery card having the card ID 5001 in the first status in FIG. 5. The mystery card having a card ID 5012 is in the second status and at a level 5 in FIG. 6. The parameters of the mystery card in the status in FIG. 6 are determined based on the current level (level 5) with reference to the initial parameters of the mystery card having the card ID 5012 in the second status in FIG. 5. For example, the current parameters are calculated by adding the points according to the level to the initial parameters, or by multiplying the initial parameters by the coefficients according to the level.

Note that the information about a mystery card can be managed separately from the information about the normal game cards. For example, the card information (not illustrated in the drawings) only for the mystery cards is stored separately from the card information (database) as illustrated in FIG. 5. As a result, the parameters of a mystery card in each status (the first status or the second status) can be managed by the card information only for the mystery cards.

In addition to the possessed card information, the information about the ID of the player, and the experience value, the item or in-game currency that the player owns is stored as the player information.

===Specific Description of Mystery Card===

The handling of a mystery card in the game system 1 will be described with citing a specific example.

<Method for Acquiring Mystery Card>

First, a method for the players to acquire a mystery card will be described. The game cards (game media) including a mystery card used in the present embodiment are distributed to the players with the distributing portion 118 in the server device 10. The game cards are distributed using a distribution method commonly referred to as "complete gacha" in response to the request from the player, or are distributed to the player as the rewards for a mission or an event. The description of the "complete gacha" is omitted because the "complete gacha" is commonly known.

In the present embodiment, the mystery cards are not distributed to all the players of the game, but are preferentially distributed to the player that has satisfied a predetermined requirement in the game. For example, the mystery cards are preferentially distributed to the players that have been ranked in top 100 in an event. The distributing portion 118 adds and stores the information about the mystery card in the first status to the possessed card information in the player information of the higher-ranking players in the event to whom the mystery card is to be distributed after extracting the player ID of the players. The time when the mystery card has been owned by the player is also stored (see FIG. 6).

Note that the mystery cards do not need to directly be distributed to the players. The mystery cards can also indirectly be distributed to the players by giving the player, for example, the participation right to a complete gacha in which the player can acquire a mystery card. In such a case, the player receiving the participation right to a complete gacha can acquire a mystery card by playing the complete gacha. Acquiring a mystery card through a complete gacha can increase the player's expectation for acquisition of a mystery card, and also can give the player a feeling of satisfaction with acquiring a valuable game card in the player's own hands.

<Status Change of Mystery Card>

Figure 7:
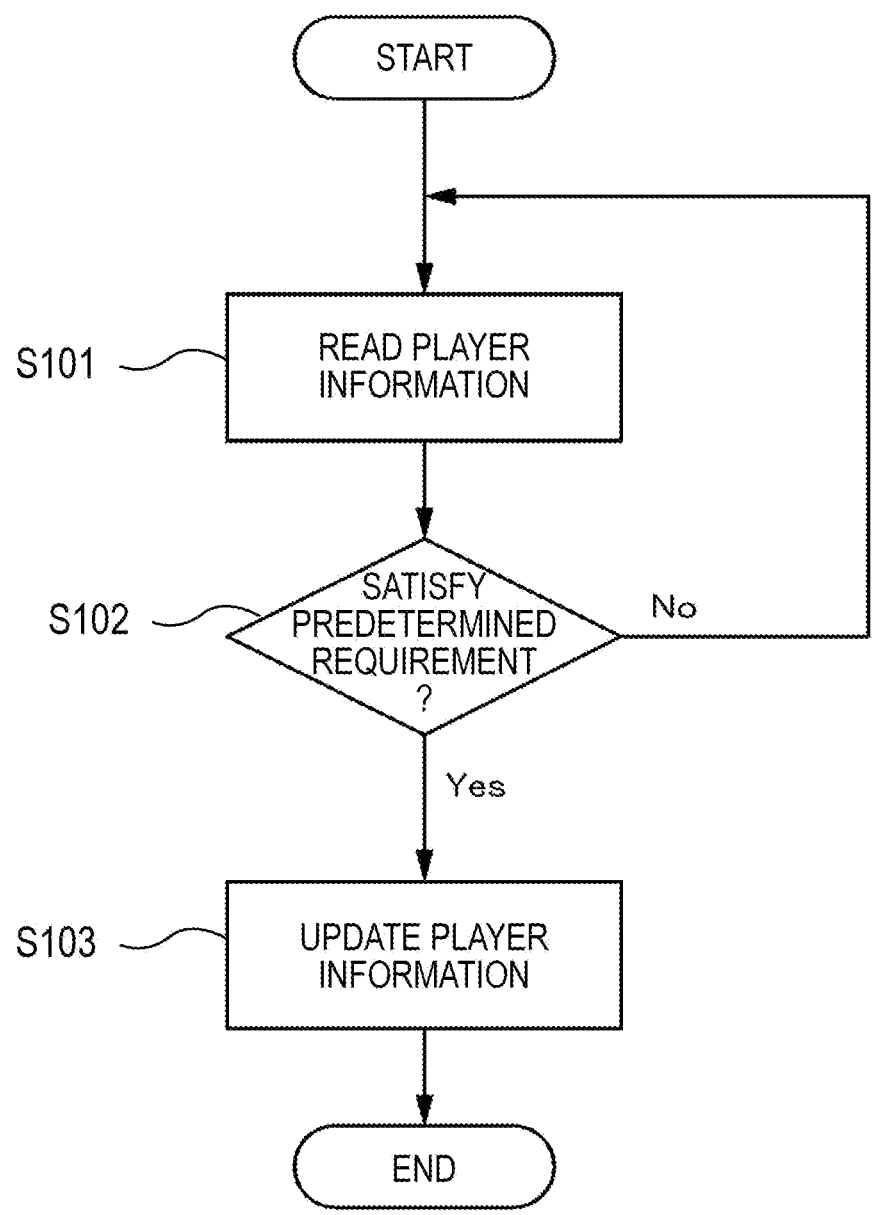
FIG. 7 is a flowchart describing the status change of a mystery card.

Next, the status change of a mystery card will be described. As described above, a mystery card is in the first status when being distributed to a player. Satisfying a predetermined requirement changes the mystery card to the second status. FIG. 7 is a flowchart describing the status change of a mystery card.

First, the determining portion 111 in the server device 10 accesses the player information or game medium information of the player owning a mystery card (for example, player A) to read the information about the mystery card (S101) in order to determine the status of the mystery card. When the information has the data configuration as illustrated in FIG. 6, it is determined whether the player A owns a mystery card. When the player A owns a mystery card, the determining portion 111 reads, for example, the data of the status of the card (indicating that the card is in the first status) and the data about the time when the player has acquired the mystery card.

Next, it is determined whether the mystery card satisfies a predetermined requirement (S102). The predetermined requirement is a "temporal requirement" in the present embodiment. The temporal requirement is whether the time of the real world has exceeded the time and date for changing the card. For example, the mystery card that the player has acquired in an event satisfies the "temporal requirement" around the time when the next event is held. Specifically, the time and date for changing the card is set at the time and date for starting the next event. When the time of the real world has exceeded the time and date for changing the card, the mystery card is changed from the first status to the second status. As described above, the mystery cards are preferentially distributed to the higher-ranking winners of the event as the rewards for the event. To liven the game, it is preferable to get the higher-ranking winners to actively join the future events. The change of the mystery card that is the reward for the previous event to a strong game card in the next event gives the player owning the mystery card a great advantage in the event (next event). Thus, owning a mystery card greatly triggers such a player to join the next event. Note that the time and date for changing the card can be set at the time and date unrelated to an event, or can differently be set for each mystery card. When whether the time of the real world has exceeded the time and date for changing the card is set as the temporal requirement, the data storage unit 12 stores the information about the time and date for changing the card in the game medium information.

Note that the "predetermined requirement" can be the elapsed time from the acquisition time when the player has acquired the game card as the temporal requirement. A requirement other than the time can be a "predetermined requirement". For example, when a "fight requirement" requiring the player owning a mystery card in the first status to fight using the mystery card in the first status against another player is satisfied, the card can be changed to the second status. In other words, the player is required to do fights using the mystery card having low parameters in the first status a predetermined number of times or more. It is expected that the player would have difficulty in the fights because the player has to consciously use the weak card as the fighting game medium. However, this can increase the player's expectation for the change of the card to the second status. When the player has raised the experience value or the level by doing a fight using the mystery card in the first status, the information about the experience value and the like continues in the second status. Thus, it is not useless to do a fight with the mystery card in the first status.

Further, a plurality of requirements can be set as predetermined requirements. For example, satisfying the temporal requirement and the fight requirement can change the mystery card from the first status to the second status.

Figure 8:
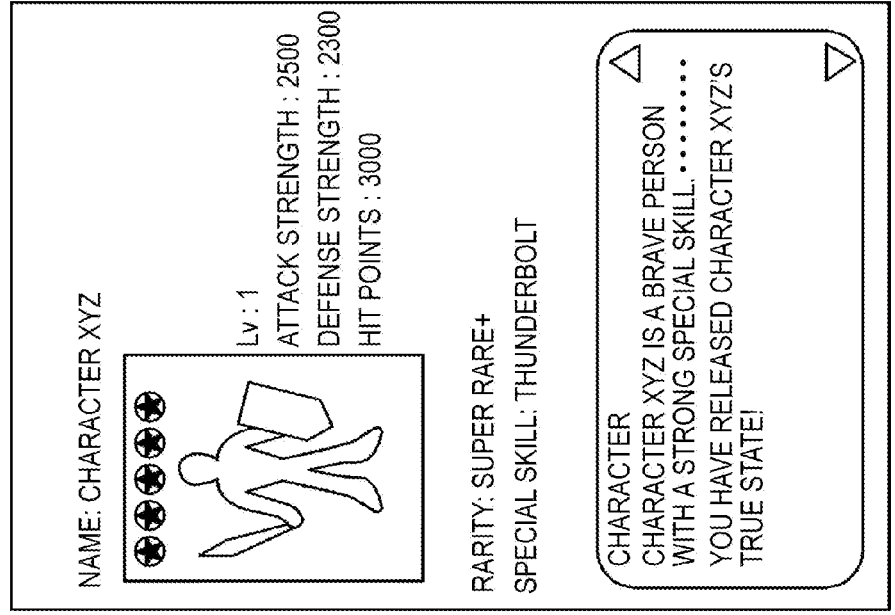
FIG. 8 is a diagram illustrating a specific example when the mystery card changes from a first status to a second status.
Figure 8:
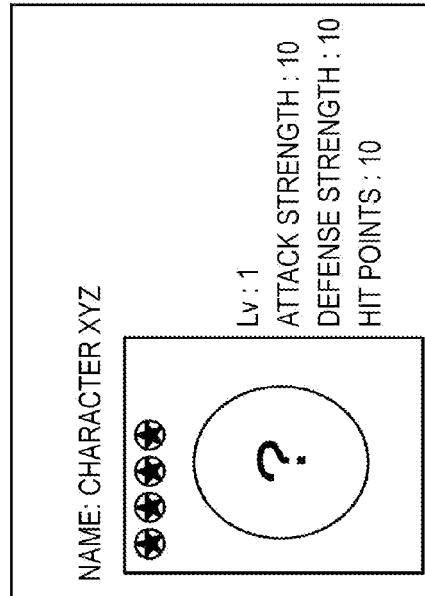

The determining portion 111 determines whether the mystery card satisfies the predetermined requirement. When it is determined that the mystery card satisfies the predetermined requirement (Yes in S102), the updating portion 112 in the server device 10 updates the player information of the player A (S103) so as to change the mystery card from the first status to the second status. FIG. 8 is a diagram illustrating a specific example when the mystery card changes from a first status to a second status. Note that FIG. 8 illustrates exemplary information about the mystery card displayed on the terminal display unit 24 in the player terminal 20. In the present embodiment, the whole or a part of the information about the mystery card is not disclosed to the player when the mystery card is in the first status. The player is not able to know what character corresponds to the mystery card that the player owns because the graphic and special skill of the character of the mystery card in the first status are not displayed in FIG. 8. The information about the parameters or name of the character can also be prevented from being disclosed. Further, it is difficult for the player to expect how the mystery card is enhanced because the mystery card has very low parameters in the initial stage (the stage of the level 1). However, the card indicates that satisfying a predetermined requirement changes the mystery card to the second status, or the second status (the true state after the change) in the description of the mystery card (the description section of the character in FIG. 8). This can stimulate the player's imagination and increase the player's expectation for the second status.

After the predetermined requirement is satisfied and the mystery card is changed to the second status, the information including the graphic is displayed to the player as well as a normal game card. The mystery card has much higher parameters in the second status in comparison with the first status. It is obvious that the mystery card greatly contributes as a fighting game medium. The disclosure of the information that has not been disclosed in the first status further increases the player's expectation or special feeling for the character corresponding to the mystery card.

On the other hand, when it is determined that the mystery card does not satisfy the predetermined requirement (No in S102), the status of the mystery card is not changed. Then, the process goes back to S101.

<Another Effect of Mystery Card>

Although the increase in the parameters has described as an exemplary effect when a mystery card changes from the first status to the second status, another effect can be provided. For example, the mystery card exerts a special effect during a predetermined period in the period when an event is held. In that case, the special effect is to correct the parameters of the mystery card in a fight. At that time, the correcting portion 113 in the server device 10 corrects the parameters of the mystery card in the second status so as to increase the parameters to predetermined values (for example, three times higher than the normal values). This further enhances the mystery card. Thus, the player owning the mystery card can more advantageously carry on the game during the event. This further increases the player's motivation to join an event. This can increase the player's motivation to join an event.

An effect in that, when the mystery card is combined with another game card during an event, the combination efficiency is corrected to be 10 times more efficient than a normal combination can be provided as another effect. For example, the combination of the game cards using the mystery card as a material gives the player the experience values of 1000 points while a combination of the game cards using a normal game card as a material gives the player the experience values of 100 points.

Other Embodiments

The above-described embodiments have been given for easy understanding of the present invention, and are not used to construe the present invention in a limited manner. It should be understood that the present invention can be changed or modified without departing from the gist of the invention, and includes the equivalents thereof. The present invention further includes the embodiments to be described below.

<Status Change of Mystery Card>

Although satisfying a predetermined requirement changes a mystery card from the first status to the second status in the above-mentioned embodiment, the status change of a mystery card is not limited to the embodiment. For example, satisfying an additional requirement can further change the mystery card in the second status to a third status.

The mystery card is not necessarily be enhanced when changing from the first status to the second status. On the contrary, the mystery card can change so as to lower the parameters. In other words, some mystery cards can be weakened. However, the condition for distribution should be eased in such a case. For example, mystery cards are distributed to all the players for free rather than being distributed as the rewards for the higher-ranking winners of an event.

<Management of Data of Mystery Card>

Although the database having the configuration illustrated in FIG. 5 or FIG. 6 is used to manage the data of the parameters and the like of a mystery card in the above-mentioned embodiment, the method for managing the data of a mystery card is not limited to the embodiment.

In a method for managing the data of a mystery card, a mystery card having the first status and the second status can separately be treated as different cards. For example, the mystery card having the card ID 5001 in FIG. 5 is not managed in a data format indicating the "status" that is the first status or the second status, but is managed as different cards that have a card ID 5001A and a card ID 5001B. In other words, the card having the card ID 5001A corresponds to a mystery card (XYZ) in the first status. The card having the card ID 5001B corresponds to the mystery card (XYZ) in the second status. Then, the cards are separately managed. In such a case, relation information indicating that the card having the card ID 5001B corresponds to the second status of the card having the card ID 5001A (information indicating the relationship between the cards) is stored so as to manage the different game cards with linking the cards to each other. This can reproduce the status change of a mystery card.

Further, the information about a mystery card in the first status in the possessed card information of a player can be overwritten with the information about the mystery card in the second status when a predetermined temporal requirement has been satisfied. For example, the mystery card having the ID 5001 has only the data (for example, the parameters) of the first status first in FIG. 5. When a predetermined temporal requirement has been satisfied, the data of the first status is overwritten with the data of the second status. In such a case, overwriting the data destroys the data of the first status. Such a management method can reduce the retaining amount of data because it is not necessary to manage the data indicating the "status" of a mystery card.

<Information Processing Device>

Although the game system 1 including a server device 10 has been cited as an exemplary information processing apparatus in the above-mentioned embodiment, the present invention is not limited to the embodiment. The game system 1 can include a plurality of server devices 10 as an information processing apparatus. That is, a plurality of server devices 10 is connected through a network 2, and each of the server devices 10 may perform various types of processing in a distributed manner.

Further, it may be configured such that the player terminal 20 bares a part of the functions as the information processing device. In this case, the server device 10 and the player terminal 20 constitute the information processing device.

<Game Program>

An example in which the player plays a fighting card game using game media such as a mystery card by cooperating the server device 10 with the player terminal 20 in the game system 1 according to the above-mentioned embodiment has been described. However, the present invention further includes a game program for performing the processes. In other words, the server device 10 and the player terminal 20 that work as an information processing apparatus can perform each of the processes based on the game program.

What is claimed is:

1. A server device that controls a game in which a player does a fight using game media in a game space through a network, the server device comprising:
   a storage unit configured to store player information including information about the game media that the player owns in the game space and about a status of the game media;
   a determining portion configured to determine whether a specific game medium among the game media that the player owns has satisfied a predetermined temporal requirement comprising a predetermined number of fights in which the player utilized the specific game medium among the game media that the player owns, the predetermined number of fights being a plurality of fights; and
   an updating portion configured to update the player information so as to change the specific game medium from a first status to a second status when the determining portion determines that the specific game medium has satisfied the predetermined temporal requirement;
   wherein character information of the specific game medium is not disclosed to a player owning the specific game medium while the specific game medium is in the first game status, the character information comprising a name of a character;
   wherein the character information of the specific game medium is disclosed to the player owning the specific game medium when the specific game medium is changed to the second status.

2. The server device according to claim 1,
   wherein the information about the status of the game media includes information about a parameter in the first status and a parameter in the second status of the specific game medium, and
   the parameter of the specific game medium in the second status differs from the parameter of the specific game medium in the first status.

3. The server device according to claim 2, further comprising:
   a correcting portion configured to correct the parameter of the specific game medium in the second status so as to raise the parameter for a predetermined period of time.

4. The server device according to claim 1,
   wherein the determining portion determines whether the player has satisfied a predetermined fight requirement by doing a fight using the specific game medium in the first status in addition to satisfying the temporal requirement, and
   the updating portion updates the player information so as to change the specific game medium from the first status to the second status when the specific game medium in the first status has satisfied the temporal requirement and the fight requirement.

5. The server device according to claim 1, further comprising:
   a distributing portion configured to distribute the specific game medium in the first status to the player such that the player owns the game medium,
   wherein the distributing portion preferentially distributes the specific game medium in the first status to a player that has satisfied a predetermined requirement in the game.

6. A non-transitory computer-readable storage medium storing game program causing an information processing apparatus to execute a game in which a player does a fight using game media in a game space through a network, the game program causing the information processing apparatus to execute:
   storing, with a storage unit, player information including information about the game media that the player owns in the game space and about a status of the game media;
   determining, with a determining portion, whether a specific game medium among the game media that the player owns has satisfied a predetermined temporal requirement comprising a predetermined number of fights in which the player utilized the specific game medium among the game media that the player owns, the predetermined number of fights being a plurality of fights; and
   updating, with an updating portion, the player information so as to change the specific game medium from a first status to a second status when the determining portion determines that the specific game medium has satisfied the predetermined temporal requirement;
   wherein character information of the specific game medium is not disclosed to a player owning the specific game medium while the specific game medium is in the first game status, the character information comprising a name of a character;
   wherein the character information of the specific game medium is disclosed to the player owning the specific game medium when the specific game medium is changed to the second status.

* * * * *